United States Patent [19]
Bayasi

[11] Patent Number: 5,733,671
[45] Date of Patent: Mar. 31, 1998

[54] CELLULOSE FIBER REINFORCED CEMENTITIOUS MATERIALS AND METHOD OF PRODUCING SAME

[75] Inventor: M. Ziad Bayasi, San Diego, Calif.

[73] Assignee: San Diego State University Foundation, San Diego, Calif.

[21] Appl. No.: 635,453

[22] Filed: Apr. 19, 1996

Related U.S. Application Data

[63] Continuation of Ser. No. 315,674, Sep. 30, 1994, abandoned, which is a continuation of Ser. No. 975,438, Nov. 12, 1992, abandoned.

[51] Int. Cl.$^6$ ..................................................... B32B 13/02
[52] U.S. Cl. .......................... 428/703; 428/292; 428/326; 428/903.3
[58] Field of Search ................... 428/703, 903.3, 428/292, 326, 393, 904, 2; 106/697, 713, 729, 805

[56] References Cited

U.S. PATENT DOCUMENTS

| | | | |
|---|---|---|---|
| 3,753,749 | 8/1973 | Nutt | 106/738 |
| 3,972,972 | 8/1976 | Yano | 106/731 |
| 3,981,950 | 9/1976 | Pletzer | 106/692 |
| 4,058,406 | 11/1977 | Raponi | 428/903.3 |
| 4,263,365 | 4/1981 | Burgess | 428/448 |
| 4,306,911 | 12/1981 | Gordon | 106/731 |
| 4,406,703 | 9/1983 | Guthrie | 106/731 |
| 4,562,218 | 12/1985 | Fornadel | 428/529 |
| 4,799,961 | 1/1989 | Friberg | 106/731 |
| 4,840,672 | 6/1989 | Baes | 106/731 |
| 4,876,151 | 10/1989 | Eichen | 428/452 |
| 4,985,119 | 1/1991 | Vinson | 106/731 |
| 5,021,093 | 6/1991 | Beshay | 106/731 |
| 5,030,289 | 7/1991 | Sattler | 106/731 |

*Primary Examiner*—Timothy Speer
*Attorney, Agent, or Firm*—Fish & Richardson P.C.

[57] ABSTRACT

A recycled fiber reinforced, moldable, settable cementitious composition which comprises cementitious material, recycled fibers, accelerator (optional), and water and a cured product therefrom, as well as a method for its preparation by suction-dewatering are disclosed.

8 Claims, 1 Drawing Sheet

CELLULOSE FIBER REINFORCED CEMENTITIOUS MATERIALS AND METHOD OF PRODUCING SAME

This is a file wrapper continuation of application Ser. No. 08/315,674, filed Sep. 30, 1994, now abandoned, which is a continuation of application Ser. No. 07/975,438, filed on Nov. 12, 1992, now abandoned.

BACKGROUND OF THE INVENTION

1. Field of the Invention

This invention, in general, relates to cellulose fiber-reinforced cementitious materials and a method of producing the same. More specifically, this invention relates to the cementitious compositions and products which have been reinforced by recycled cellulose fibers as well as to a method of producing such materials.

2. Description of the Related Art

Various fibrous materials have been employed in the past to reinforce cement or mortar. For example, wood fiber, wood chips, sawdust, glass fibers, and asbestos fibers are considered suitable reinforcing materials. The use of asbestos fibers, however, has become a health concern due to the risks for the workers and users who are exposed to asbestos.

U.S. Pat. No. 3,753,749 discloses concrete compositions based on Portland cement which contain a minor proportion (about 0.2 to about 5 weight percent based on the weight of the cement) of dispersed cellulose fibers.

U.S. Pat. No. 3,972,972 discloses a process for producing a cement board. Granules of cement are mixed with properly sized fibrous material and the resulting granule mixture is made into a board under compression.

U.S. Pat. No. 3,981,950 discloses a method for producing a cement-bonded molded articles. A molding composition which comprises a Portland cement binder, fibrous materials such as wood fiber or wood chips, and a calcium-halogen aluminate is fed in a heated molding duct to make a molded article.

U.S. Pat. No. 4,306,911 discloses fiber reinforced hydraulically setting materials which include 2 to 20 volume percent of filter fibers and 0.5 to 20 volume percent of reinforcing fibers. Both fiber materials are pretreated with inorganic compounds such as aluminum sulfate or calcium hydroxide.

U.S. Pat. No. 4,406,703 discloses a method of producing cement composite materials which include plant fibers. The fiber is pretreated with a solution containing dichromate ion and permanganate ion.

U.S. Pat. No. 4,799,961 discloses a cementitious composition which includes about 0 to 20 weight percent fibrous material, at least a part of which is processed wood fiber such as mill waste or pulp paper waste.

U.S. Pat. No. 4,840,672 discloses a lightweight cement-based insulating board which includes, among others, 0–5 weight percent of cellulose fibers and 0.5–4 weight percent of non-cellulose, alkali-resistant fiber material.

U.S. Pat. No. 4,985,119 discloses a cellulose-fiber reinforced structure which includes between about 4 and about 15 weight percent pulped softwood fibrous material based on the total weight of nonhydrated components. The fibrous material used must have certain summerwood fiber content.

U.S. Pat. No. 5,021,093 discloses a cement composite wherein cellulose fibers pregrafted with a silylating agent are included.

U.S. Pat. No. 5,030,289 discloses molded construction parts which are prepared from the hydration products of a settable construction material which includes a minor proportion of cement and waste paper fibers and cellulose fibers.

While the properties of the above-described fiber-reinforced cementitious materials are generally satisfactory, it is desirable to increase the strength and toughness of the materials. However, increasing the quantity of fibers is not economically advantageous. Also, none of the above-indicated references teaches or suggests the inclusion of high volume portions of fibers in cement. The present invention achieves the goal of obtaining inexpensive cementitious materials while retaining certain levels of strength and toughness by including recycled cellulose fibers in a cement composition. None of the cementitious compositions of the prior art are known to contain recycled cellulose fibers.

SUMMARY OF THE INVENTION

Accordingly, it is an object of the present invention to provide cementitious products which posses improved strength and toughness and are lightweighted by the incorporation of high quantity recycled cellulose fibers therein, but which are less expensive to manufacture than the prior art fiber-reinforced cements.

It is another object of the present invention to provide a method of preparing a cementitious product which contains high quantity recycled cellulose fibers by suction-dewatering of a cementitious composition containing a large amount of water.

It has been surprisingly discovered that the cementitious products obtained in this manner have both the favorable properties of wood and concrete and yet are favorably comparable to conventional fiber-reinforced cements with regard to various mechanical characteristics and manufacturing costs.

The above objects, as well as further objects, features and advantages of the present invention will be more fully understood by reference to the following detailed description and drawings.

DETAILED DESCRIPTION OF THE INVENTION

Figure 1:
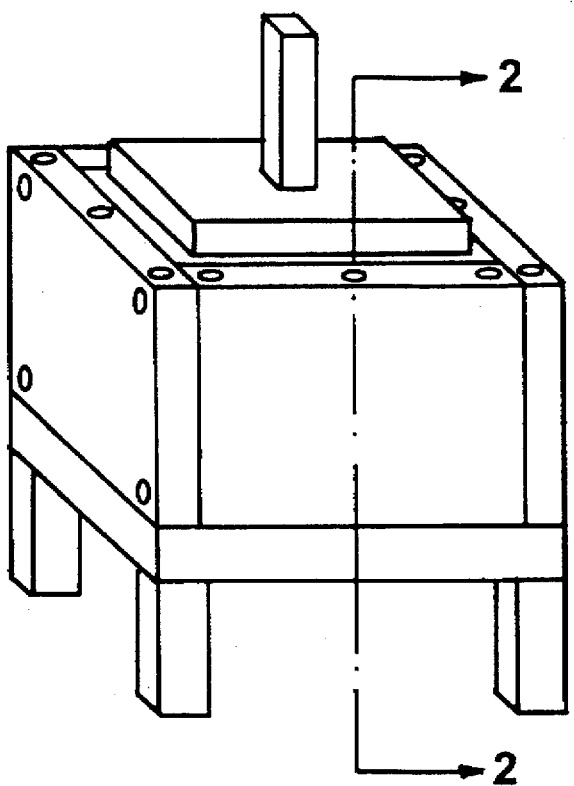
FIG. 1 shows a prospective view of an apparatus for suction-dewatering a cementitious composition in accordance with the present invention.

The components of the present cementitious composition essentially comprises the following materials: cementitious material; sized recycled cellulose fibers; an accelerator; and water. Additional materials or additives known in the art may be included in the composition, depending upon the intended use of a final cementitious product, although they are unnecessary for the purposes of the present invention.

The cementitious materials which can be used in the present invention include various types of Portland cement. Low alkali Portland cement is particularly preferred. High alkalinity tends to deteriorate cellulose fibers in cement.

The fibrous component of the present composition preferably comprises properly sized recycled cellulose fibers. The particularly preferred fibers are newsprint and magazine fibers. The fibers are preferably used in cut lengths of from about 1 to 20 millimeters (more preferably from about 4 to 8 millimeters), whereby both individual fibers of uniform length and a mixture of fibers of different length can be admixed. The recycled fibers provide attributes in the present composition that are normally furnished by wood. Thus, addition of recycled fibers make the finished product workable in a fashion similar to wood. In addition, the fibers lessen the overall density of the resulting composite material as well as impart both thermal and acoustical insulative properties thereto. Further, the mechanical properties of the product such as tensile strength, impact resistance, and ductility are greatly improved. Recycled fibers are considerably less expensive than fibers from other sources. The use of recycled fibers thus offer economic advantages. More importantly, their use will be socially welcomed in view of growing concern about waste paper products such as newspapers and magazines. An increasing amount of waste paper products is overflowing landfills across the country. Particularly, magazines cannot be recycled due to the excessive amounts of clay contained. Therefore, reuse of newsprint and magazines may contribute to the solution of the waste management problem that municipal governments are facing today. Other known fibrous materials such as wood chips, paper mills sludge, saw dusts, and virgin fibers may be included in the present composition to produce a satisfactory product.

The accelerators optionally used in a cementitious composition increase the speed of setting of cement, but does not materially affect the final strength thereof. Preferred accelerators to be used in the present invention include calcium chloride, sodium chloride, and sodium sulfate. The most preferred accelerator is calcium chloride, especially in aqueous solution.

The additional additives which may be incorporated in the present cementitious composition include calcined gypsum, clay, lime clinker, pozzolans, and acrylic polymers. They are expected to exhibit substantially the same qualitative effect as in general cement mixtures. Clay, being partly aluminates, increases the plasticity of a cement premix as well as the hardness and compressive strength of a final product. As indicated earlier, the recycled magazines contain clay. Therefore, some clay may be included in the present composition by the use of recycled magazines as a fibrous material. In relatively low amounts as used in this manner, such clay is beneficial. The pozzolanic materials such as silica fume reduce the alkalinity of the cement, thus increasing the durability of the fibrous component in the cementitious composition. The acrylic polymers modify the surface properties of cementitious products, and tend to increase the surface adhesion thereof.

The volume of the fibrous component used in the present invention is proportioned within a cement matrix in such a way to produce a product with desired strength, unit weight, and wood-like properties. However, to impart wood-like properties to a cement product, it is preferred that fiber volumes be maintained in an amount of greater than about 20% in the final product. Preferably, about 22% to about 40% by volume fibers are present in the product. In order to obtain the desired fiber levels, fiber volumes in an initial composition must be greater than about 7%. Preferably, about 8% to about 12% by volume fibers are present in the initial composition. Lower contents of fibers, although they enhance the flexural strength, increase the overall production costs as well as the hardness of a cementitious product, but decrease its workability. Workability is critical in the present invention so that a final product can have wood-like properties. Higher contents of fibers impair the flexural strength.

The proportions of water and cementitious materials is preferably set at from about 2.0 to about 5.0, more preferably from 2.0 to about 2.5, in order to attain a homogeneous and workable mix. Since cellulose fibers possess large surface areas and natural affinity for moisture, a high initial water content in the mix is required. The final ratio of water to cement, upon processing the initial composition, is within the range of from about 0.25 to about 0.5, preferably within the range of from about 0.3 to about 0.4. A lesser amount of water will hasten setting and provides higher strength of the mix but a higher amount of water generally provides better workability.

The ratio of the accelerator to the cementitious material is preferred within the range of from 0 to about 0.05 in an initial composition, preferably within the range of from about 0 to about 0.04.

The cementitious compositions and products according to the present invention can be manufactured by several methods. In one method (molding), the cementitious composition is prepared by admixing cementitious material, water, recycled cellulose fibers, and accelerator in proportions as defined above to form a slurry. The admixing is effected by use of a mortar mixer or paddle mixer. The slurry is then cast and compacted in a mold by vibration.

Figure 2:
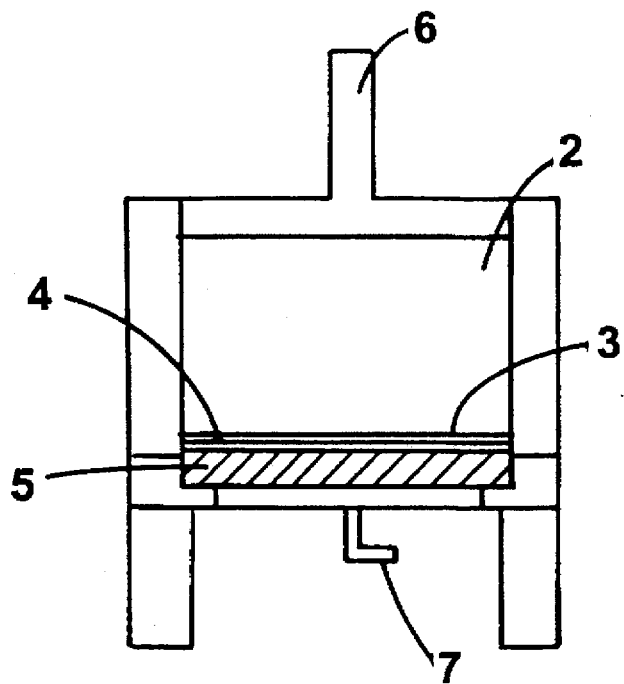
FIG. 2 shows a A—A sectional view of the apparatus illustrated in FIG. 1.

A more preferred method consists of suction-dewatering technique. This technique is particularly useful in the present invention, since a large quantity of water must be used in forming the slurry and water must be removed during the manufacturing process. Referring to FIGS. 1 and 2, this manufacturing process can be readily understood. The slurry is applied to a suction-dewatering apparatus 1 by being poured into a container 2. The apparatus is provided with layers of filters located at the bottom of container 2. The first layer consists of a disposal paper filter 3. The second layer is a steel filter 4 (#100 mesh, 0.15 mm diameter) placed underneath the first paper filter 3. The third layer is a perforated steel plate 5 (about one inch thick) placed underneath the second steel filter. After the slurry has been evenly distributed within the container, a lid 6 (about one inch steel plate) is placed on top of the slurry. A hydraulic press is used to apply pressure to lid 6. The applied pressure removes excessive water from the slurry.

The water passes through the filters and is drained through a vent 7. Suction may be applied to the slurry simultaneously through vent 7 by means of negative pressure. The suction facilitates the removal of water. The suction-dewatering technique using the apparatus described above achieves the efficient elimination of excess water from a cementitious mix. Thus, the present method allows the initial cement slurry to contain a large amount of water.

The slurry worked on a dewatering apparatus will be made into the desired article such as panels, pipes, bricks, roof tiles, telephone poles, railroad ties, and products of all kinds as can be formed in a known manner manually of by machine. The thus formed cementitious products are then left in a conventional manner to cure, and can be nailed, sawed and otherwise handled substantially like wood. Because of wood-like properties and low manufacturing costs, the cellulose fiber-reinforced cementitious products of the present invention can substitute for timber in many construction applications.

Although the present invention will be described by way of several embodiments thereof, it should be realized that many alternatives, modifications, and variations will be apparent to those skilled in the art of the foregoing description. Accordingly, it is intended to embrace all such alternatives, modifications, and all variations as falling within the spirit and broad scope of the appended claims.

EXAMPLES

A number of experiments were performed using the standardized procedures.

An initial slurry was prepared from low alkali Portland cement (Pacific Cement Company, Los Angeles, Calif.), DARACEL® (40% $CaCl_2$ aqueous solution Grace Construction Production, Cambridge, Mass.), sized magazine fibers (size range 4–8 mm, preground average size 6 mm, available from Interfibe Research Corporation, Kalamazoo, Mich.) and water in predetermined proportions. Mixing was done by hand or a mixer to the extent that a reasonably homogeneous mix was obtained. The slurry mix was processed on the suction-dewatering apparatus described herein with a dewatering pressure of 1 ksi to form cementitious materials which, depending on fiber content and the amounts of materials used, were 8×8 inches in size and from 1.2 to 1.4 inches in thickness. All samples were removed from the suction-dewatering apparatus and cured for various testings in the open air at ambient temperature.

The cementitious products thus prepared were first tested to evaluate the wood-like properties. This test procedure involves cutting a sample product with a conventional wood saw as well as nailing the sample with a nail. In both tests the samples behaved in a manner that was comparable to lumber products commonly used in the construction industry.

The sample products were further tested for the flexural strength. A typical test procedure followed a three-point loading system, with loads being applied by a universal testing machine. Three 2×4 inch specimens sawed from a cured product were subjected to flexural strength tests.

EXAMPLE 1

One part by weight of Portland cement, 2 parts by weight of water and 0.08 parts by weight of DARACEL® were mixed. Then, one part by volume of recycled magazine fiber (1 about ¼ inches in length) was added to 11.5 parts by volume of the initial mix. The final mix was processed as described above. The cementeuous product so obtained had a flexural strength, a water/cement ratio, a final fiber volume fraction and a unit weight as tabulated in Table 1.

EXAMPLE 2

One part by weight of Portland cement, 2 parts by weight of water and 0.08 parts by weight of DARACEL® were mixed. Then, one part by volume of recycled magazine fiber (about ¼ inches in length) was added to 10.8 parts by volume of the initial mix. The final mix was processed as described above.

The final cementitious product so obtained had a flexural strength, a water/cement ratio, a final fiber volume fraction and a unit weight as tabulated in Table 1.

EXAMPLE 3

One part by weight of Portland cement, 2 parts by weight of water and 0.08 parts by weight of DARACEL® were mixed. Then, one part by volume of recycled magazine fiber (about ¼ inches in length) was added to 9 parts by volume of the initial mix. The final mix was processed as described above. The final cementitious product so obtained had a flexural strength, a water/cement ratio, a final fiber volume fraction and a unit weight as tabulated in Table 1.

EXAMPLE 4

One part by weight of Portland cement, 2 parts by weight of water and 0.08 parts by weight of DARACEL® were mixed. Then, one part by volume of recycled magazine fiber (about ¼ inches in length) was added to 8.5 parts by volume of the initial mix. The final mix was processed as described above. The final cementitious product so obtained had a flexural strength, a water/cement ratio, a final fiber volume fraction, and a unit weight as tabulated in Table 1.

EXAMPLE 5

One part by weight of Portland cement, 2 parts by weight of water and 0.08 parts by weight of DARACEL® were mixed. Then, one part by volume of recycled magazine fiber (about ¼ inches in length) was added to 7.3 parts by volume of the initial mix. The final mix was processed as described above. The final cementitious product so obtained had a flexural strength, a water/cement ratio, a final fiber volume fraction, and a unit weight as tabulated in Table 1.

TABLE 1

| Example No. | Water/Cement Ratio | Fiber Volume Fraction (%) | Flexural Strength (psi) | Unit Weight (lbs/ft) |
| --- | --- | --- | --- | --- |
| 1 | 0.39 | 22 | 1590 | 90.2 |
| 2 | 0.33 | 25 | 1701 | 89.8 |
| 3 | 0.42 | 26 | 1416 | 83.1 |
| 4 | 0.45 | 30 | 1184 | 80.2 |
| 5 | 0.80 | 40 | 990 | 67.7 |
| Wood | | | 499–7000 | 25–70 |
| Concrete | | | 300–800 | 150 |

As the results in Table 1 show, it is possible to produce cementitious products which are similar in their properties to wood materials. Unit weights will decrease, and flexural strength will increase as the product continues to cure.

In general, the incorporation of recycled fibers according to the present invention is beneficial in many respects when applied to any concrete making composition. Benefits such as improved flexural strength, reduced unit weights and wood-like properties are obtained whether the product is to be utilized in the form of structural material such as a mortar or a surfacing material or in any other form. Additional benefits are apparent from the low manufacturing costs of the cementitious products.

The invention now being fully described, it will be apparent to one of ordinary skill in the art that many changes and modifications can be made without departing from the spirit or scope of the invention.

I claim:

1. A cementitious product consisting of Portland cement, fiber consisting of recycled newsprint or magazines, and water, wherein the weight ratio of water to the Portland cement is from about 0.025 to about 0.80; and the recycled newsprint or magazine fibers are present in the product in from about 30 to about 40% by volume based on the volume of the product; wherein the fibers are about 4 to 8 mm in length.

2. The cementitious product according to claim 1, wherein the Portland cement is low alkali.

3. The cementitious product according to claim 1, further comprising accelerator.

4. The cementitious product according to claim 3, wherein the accelerator is calcium chloride.

5. The cementitious product according to claim 1, wherein the recycled fibers are derived from recycled magazines.

6. The cementitious product according to claim 1, wherein the weight ratio of water to the cementitious material is from about 0.25 to about 0.45.

7. The cementitious product according to claim 1, wherein the product is a telephone pole.

8. The cementitious product according to claim 1, wherein the product is a railroad tie.

* * * * *